Nov. 8, 1927.

W. H. WINEMAN 1,648,096

ROCK CHANNELER

Filed July 15, 1925

Inventor:
Wade H. Wineman.
by
V. T. Lassyne
Attorney.

Patented Nov. 8, 1927.

1,648,096

UNITED STATES PATENT OFFICE.

WADE H. WINEMAN, OF MICHIGAN CITY, INDIANA, ASSIGNOR TO SULLIVAN MACHINERY COMPANY, A CORPORATION OF MASSACHUSETTS.

ROCK CHANNELER.

Application filed July 15, 1925. Serial No. 43,779.

My invention relates to apparatus for channeling rock, more especially for use in quarries for cutting blocks of stone and for use wherever it is desired to cut channels in the rock.

In channeling, especially when cutting out blocks or dimensioned stones it has been found desirable to drill a series of alined substantially equidistant relatively closely spaced holes. Having produced the required number of holes it has been found desirable to broach the solid portion or partition of the rock between the holes to form a continuous channel. The broaching operation is substantially the same as the drilling operation, with a broaching tool substituted for the usual drill bit in the drilling machine.

Among the objects of the present invention is to provide improved means for performing a broaching operation. Another object of my invention is to provide an improved broaching tool or drift. Still another object of my invention is to provide an improved relatively inexpensive and rugged broaching tool for cutting out the partitions between a series of closely spaced drill holes thus forming a channel. These and other objects will, however, hereinafter more fully appear.

More specifically, my invention is comprised of a broaching tool or drift having a shank portion adapted to be inserted within a rock drilling impact tool in place of the usual drill bit and has formed thereon at its forward end a cylindrical body portion adapted to be guided in one of the drill holes during the broaching operation. The body portion has formed therein an angularly disposed slot or recess within which a detachable cutting element is adapted to be inserted. A transversely disposed pin is provided for holding the cutting element in operative position. However, if desired this cutting element may be formed integral with the cylindrical body portion.

In the accompanying drawings I have shown for purposes of illustration one form which my invention may assume in practice.

In these drawings,—

Figure 1:
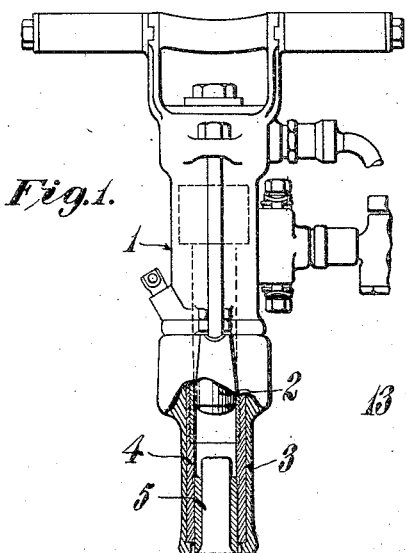
Fig. 1 is an elevational view, partially broken away in section, of an impact drilling machine with which my improved broaching tool or drift is incorporated.
Figure 2:
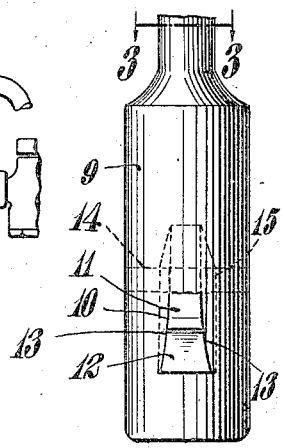
Fig. 2 is a front elevation of my improved broaching tool.
Figure 3:
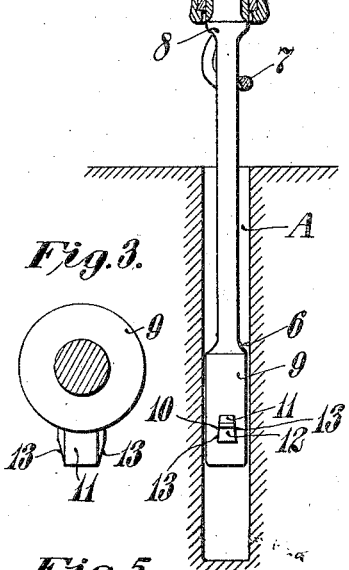
Fig. 3 is a transverse sectional view taken substantially on line 3—3 of Fig. 2.

In the illustrative embodiment of my invention I have shown a standard drilling machine, generally designated 1, of the well known impact type having reciprocable therein a usual hammer piston 2. As shown, the forward end of the drilling machine is provided with a chuck housing 3 within which a usual chuck 4 is disposed and adapted to support the shank 5 of my improved broaching tool or drift 6 in operative position. A usual retainer 7 is provided adapted to cooperate with a collar 8 formed on the broaching tool for preventing excessive movement of the latter.

The improved broaching tool 6 does comprise a cylindrical body portion 9 having formed therein and extending partially therethrough an angularly disposed recess or slot 10 within which a detachable cutting element 11 is adapted to be inserted. As shown, the cutting element 11 is provided with an inclined bottom cutting surface 12 and upwardly inclined converging side walls 13, the latter forming clearance for the cutting surface. Formed in the body of the cutting element 11 is an opening 14 through which passes a transversely disposed pin 15, which is preferably easily removable and locks the cutting element in position within the slot 10. Instead of making the cutting element removable, the same may be forged integral with the guiding portion 9 if desired.

Figure 4:
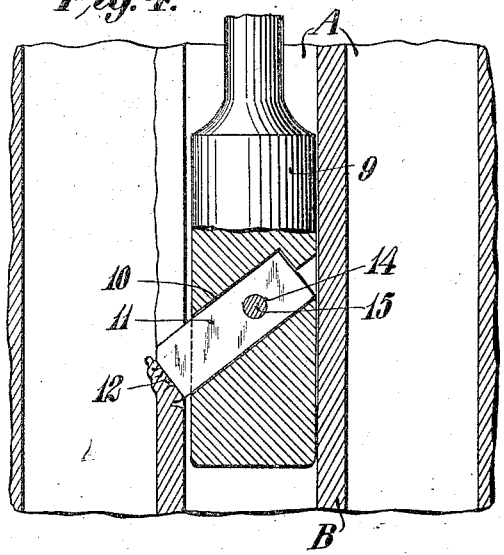
Fig. 4 is a side elevation partially in section of the broaching tool shown in Fig. 2, the same being shown in operative position in a drill hole.
Figure 5:
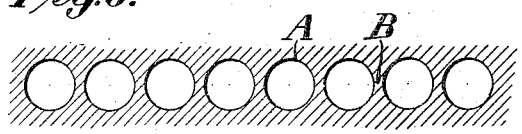
Fig. 5 is a diagrammatic plan view indicating the drill holes prior to the broaching operation.
Figure 6:
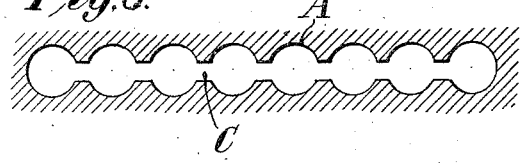
Fig. 6 is a diagrammatic plan view illustrating the drill holes subsequent to the broaching operation.

In the use of my improved broaching tool it will herein be noted that a series of alined closely spaced holes A are drilled in the rock as clearly shown in Fig. 5. After the drilling operation has been completed the usual rock drill bit is withdrawn from the chuck 4 of the drilling machine 1 and my improved broaching tool substituted therefor. The operator then inserts the lower portion of the cylindrical body 9 of the broaching tool in one of the drill holes A and the hammer piston 2 of the impact motor is then suitably actuated, causing the same to strike a series of impact blows on the shank 5 of the tool in a well known manner. This causes the inclined cutting edge 12 of the cutting element to break away the partition B between two adjacent holes as the drilling machine is forced forwardly as clearly shown in Fig. 4, the body portion 9 of the broaching tool being guided in the drill hole at that time. After the broaching operation is completed on the first hole the broaching tool is withdrawn and inserted in the next adjacent hole, this operation being repeated until a continuous cut or channel is made, as indicated at C in Fig. 6, thus enabling the rock or stone to be split with facility and with accuracy.

While I have in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a broaching tool of the impact type, a shank having an enlarged body portion forming a guide, said body portion being provided with an angularly disposed recess, a cutting element snugly fitting in said recess and having an upwardly inclined bottom cutting surface and upwardly converging side walls, and removable means for retaining said cutting element in said recess.

2. In a broaching tool of the impact type, a cylindrical body formed integral therewith and having an inclined recess opening on one side of said body, a detachable cutting element fitting in said recess, and retaining means for securing said element in said recess comprising a pin extending transversely through said element and said body portion, said cutting element having an upwardly inclined cutting surface and side walls inclined upwardly toward one another to provide clearance for said cutting surface.

3. In a broaching tool of the impact type having a body portion forming a guide, and a cutting element projecting laterally from said body portion and having an inclined bottom surface and converging side walls forming clearance for the cutting edges, said side walls being portions of planes forming a dihedral angle with each other whose edge is at an angle of more than forty-five degrees with the longitudinal line of the broaching tool, said bottom surface being substantially perpendicular to said edge.

4. In a broaching tool of the impact type, a shank having a body portion forming a guide, and a cutting element projecting laterally from said body portion and having an inclined bottom cutting surface and side walls converging upwardly and radially outwardly to form clearance for the cutting surface, said upward convergence being greater than said radial convergence, said cutting element having a substantially vertical surface defining its outer extremity.

In testimony whereof I affix my signature.

WADE H. WINEMAN.